US007443861B2

(12) United States Patent
Lee et al.

(10) Patent No.: US 7,443,861 B2
(45) Date of Patent: Oct. 28, 2008

(54) METHOD OF CONTROLLING UPSTREAM DATA TRANSMISSION IN ETHERNET PON AND APPARATUS THEREOF

(75) Inventors: Ho Sook Lee, Jeonju (KR); Tae Whan Yoo, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 858 days.

(21) Appl. No.: 10/700,613

(22) Filed: Nov. 3, 2003

(65) Prior Publication Data

US 2004/0095884 A1 May 20, 2004

(30) Foreign Application Priority Data

Nov. 4, 2002 (KR) .................. 10-2002-0067964

(51) Int. Cl.
*H04L 12/28* (2006.01)
*H04L 12/56* (2006.01)
(52) U.S. Cl. .................. 370/395.42; 370/468
(58) Field of Classification Search ............. 370/395.4, 370/395.42, 395.43, 468
See application file for complete search history.

(56) References Cited

U.S. PATENT DOCUMENTS 6,783,367 B1 * 8/2004 Wang et al. .................. 434/276

2003/0227926 A1 * 12/2003 Ramamurthy et al. ... 370/395.42
2004/0202121 A1 * 10/2004 Yuang et al. ................. 370/329

OTHER PUBLICATIONS

IEEE Communications Magazine, Feb. 2002, pp. 74-80.
802.3ah Meetings, St. Louis, MO, pp. 2-17.
802.3ah P2MP Track, pp. 2-17.

* cited by examiner

*Primary Examiner*—Ronald Abelson
(74) *Attorney, Agent, or Firm*—Blakely, Sokoloff, Taylor & Zafman (57) ABSTRACT

A method of controlling data transmission in an Ethernet passive optical network (EPON) and an apparatus thereof are provided. Transmission permission messages using a mode of bandwidth allocation are queued in a queuing unit according to the types of the transmission permission messages. A transmission time duration of upstream data is defined for each of the transmission permission messages queued in the queuing unit. A bandwidth allocation unit generates transmission permission messages to allocate upstream data transmission bandwidth for an optical network unit (ONU), based on the transmission permission messages stored in the storage unit. A scheduler designates the predetermined priority, reads transmission permission messages from queues according to a predetermined priority, determines a transmission start time of upstream data, and outputs the transmission permission messages.

16 Claims, 5 Drawing Sheets

METHOD OF CONTROLLING UPSTREAM DATA TRANSMISSION IN ETHERNET PON AND APPARATUS THEREOF

BACKGROUND OF THE INVENTION

This application claims the priority of Korean Patent Application No. 2002-67964, filed on Nov. 4, 2002, in the Korean Intellectual Property Office, the disclosure of which is incorporated herein in its entirety by reference.

1. Field of the Invention

The present invention relates to a method of controlling upstream data transmission in an Ethernet passive optical network (hereinafter, referred to as an "EPON") and an apparatus thereof.

2. Description of the Related Art

Recently, a passive optical network (PON) based on low-cost and high-efficiency Ethernet has come to forefront as the network configuration technology for high-speed optical subscriber networks. An EPON serves as the transmission network between a subscriber and a backbone network. An EPON has the structure of an optical subscriber network, in which several optical network units (ONUs) are connected to an optical line termination (OLT) in a tree-topological branch structure using a passive optical splitter. In an EPON, due to physical connection characteristic of the tree-topology, downstream data transmission and upstream data transmission are performed in different ways. Downstream data from an external network to the subscriber is broadcasted from an OLT to all ONUs. On the other hand, upstream data transmission from the subscriber to the external network requires an efficient transmission control (medium access control (MAC)) function, so that data from each ONU does not collide after being sent to the OLT.

An OLT and an ONU in EPON system communicate with an Ethernet protocol data unit of IEEE 802.3 MAC frame. The IEEE 802.3ah, study groups of standardization for Ethernet in the First Mile (EFM), recommend multi-point control protocol (MPCP) as a method for controlling PON transmission while preserving the Ethernet MAC protocol. MPCP is a transmission control protocol which controls transmission between ONUs and an OLT via a MAC control frame, in a higher layer than the 802.3 MAC control layer. Basic functions of MPCP include ONU registration and ranging functions, as well as a function for allocating upstream bandwidth. For this purpose, additional control frames such as GATE, REPORT, REGISTER, REGISTER_REQUEST and REGISTER_ACK are defined. The current MPCP has been widely recognized as a protocol for controlling upstream data transmission in an EPON. Standardization regarding an MPCP message format for efficient upstream bandwidth allocation has been discussed with enthusiasm.

For bandwidth allocation between ONUs and an OLT, MPCP implementations support a static bandwidth allocation mode (which is a simple time-sharing without request) or a dynamic bandwidth allocation mode in which an OLT grants bandwidth to each ONU through request messages. The static bandwidth allocation mode is simple to implement and guarantees constant transmission delay. However, when a system load is low, bandwidth utilization is reduced, and the mean transmission delay is increased. In the dynamic bandwidth allocation mode, upstream bandwidth can be shared efficiently depending on the network offered load, however, the transmission delay for each frame is not constant. Thus, in the case of delay sensitive real-time services, service quality may not be guaranteed. In the prior art, the bandwidth allocation process determines the transmission duration and the transmission start time simultaneously for the permitted ONUs. However, this method can not support both static bandwidth allocation function and dynamic bandwidth allocation function. In order to apply multiple bandwidth allocation function regarding on the characteristics of services and demands, each module have to check the timing information of another bandwidth allocation module. Thus, when a conventional bandwidth allocation technique is applied, implementation of each bandwidth allocation module becomes very complicated, and the probability of unexpected fragmentation during a bandwidth allocation operation, increases.

SUMMARY OF THE INVENTION

The present invention provides a method and an apparatus for controlling upstream data transmission in an Ethernet passive optical network (EPON), which can simultaneously or selectively accommodate a static bandwidth allocation function and a dynamic bandwidth allocation function, to satisfy subscriber network conditions that require various services, apply an efficient MPCP schedule technique therefor, and reduce fragmentation caused by differences in transmission delays between optical network units (ONUs) and an OLT.

According to one aspect of the present invention, a method of controlling data transmission in an Ethernet passive optical network (EPON) using a multi-point control protocol (MPCP) includes (a) generating transmission permission messages and determining a transmission duration of upstream data corresponding to the messages using different bandwidth allocation rules, (b) queuing the transmission permission messages according to types of the messages, (c) determining priorities of the transmission permission messages based on their types and registration information of an optical network unit (ONU), and (d) determining a transmission start time and outputting the transmission permission messages.

According to another aspect of the present invention, an apparatus which controls data transmission in an Ethernet passive optical network (EPON) using a multi-point control protocol (MPCP), includes a bandwidth allocation unit, which generates transmission permission messages to allocate upstream data transmission bandwidth to each optical network unit (ONU), a queuing unit, which stores the transmission permission messages according to types of the transmission permission messages, and a scheduler, which designates the predetermined priority, reads the transmission permission messages from queues according to a predetermined priority, determines a transmission start time of upstream data, and outputs the transmission permission messages.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described with the attached drawings.

Figure 1:
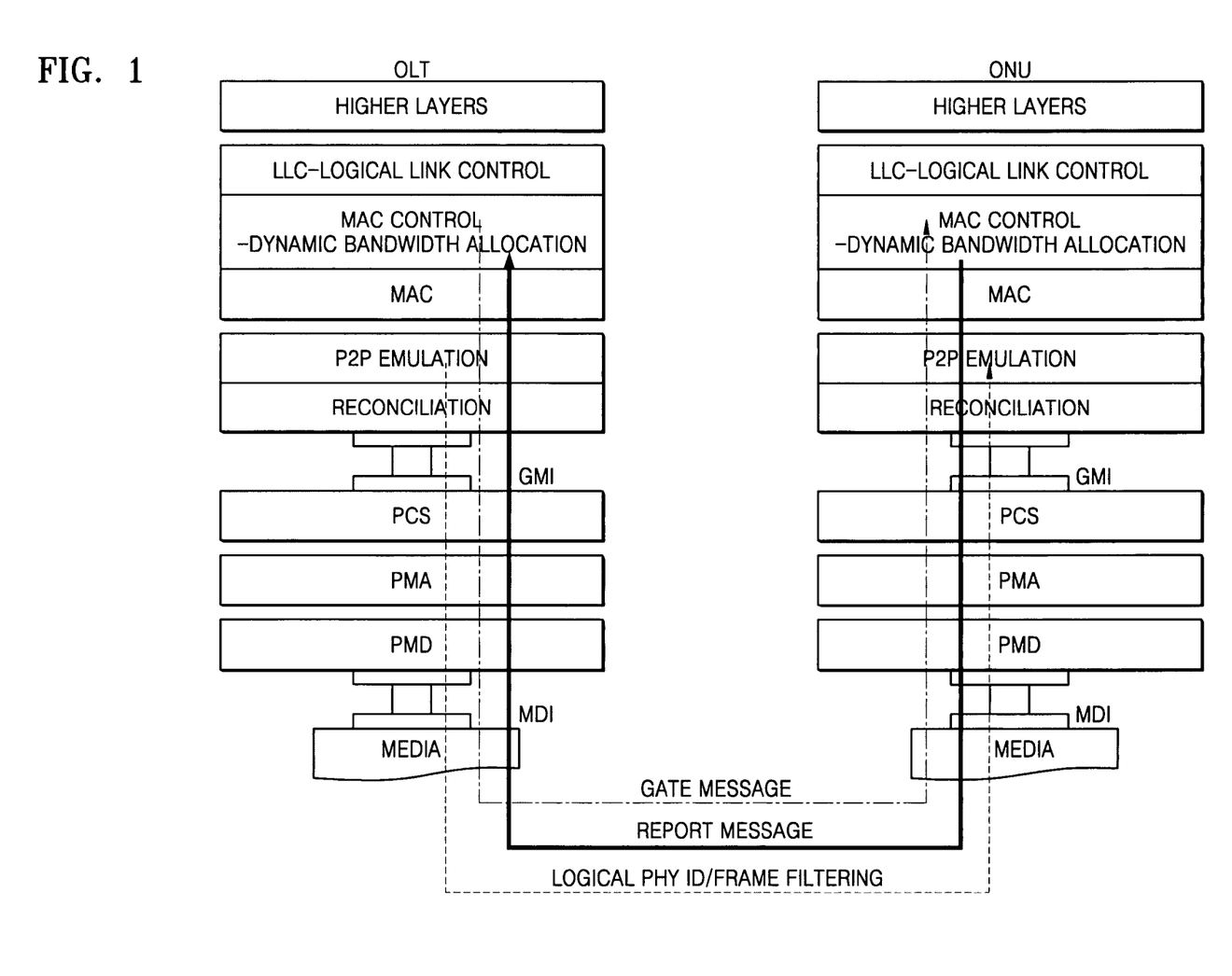
FIG. 1 shows transmission layers of an Ethernet passive optical network (EPON)

The present invention presents methods for controlling data transmission in an Ethernet passive optical network (EPON) using a multi-point control protocol (MPCP), in particular, methods for controlling upstream channel data transmission in an EPON. More specifically, the present invention presents a method of dual scheduling permission technique for simultaneously applying a static bandwidth allocation and a dynamic bandwidth allocation, a method for determining a transmission start time in a medium access control (MAC) layer, and a method for removing fragmentation that occurs during a bandwidth allocation operation due to different transmission distances between optical network units (ONUs) and an optical line termination (OLT). The method for controlling upstream data transmission between ONUs and an OLT, presented in the present invention, is based on a control method using MPCP, as shown in FIG. 1. An MPCP is placed above an Ethernet MAC control layer and is a client for MAC control. The MPCP message to control transmission between the ONU and the OLT is embedded in Ethernet MAC control frame and follows a format that is defined by the IEEE 802.3ah study group. The function of each layer shown in FIG. 1 is easily understood by a person skilled in the art, and thus, descriptions thereof will be omitted.

Figure 2:
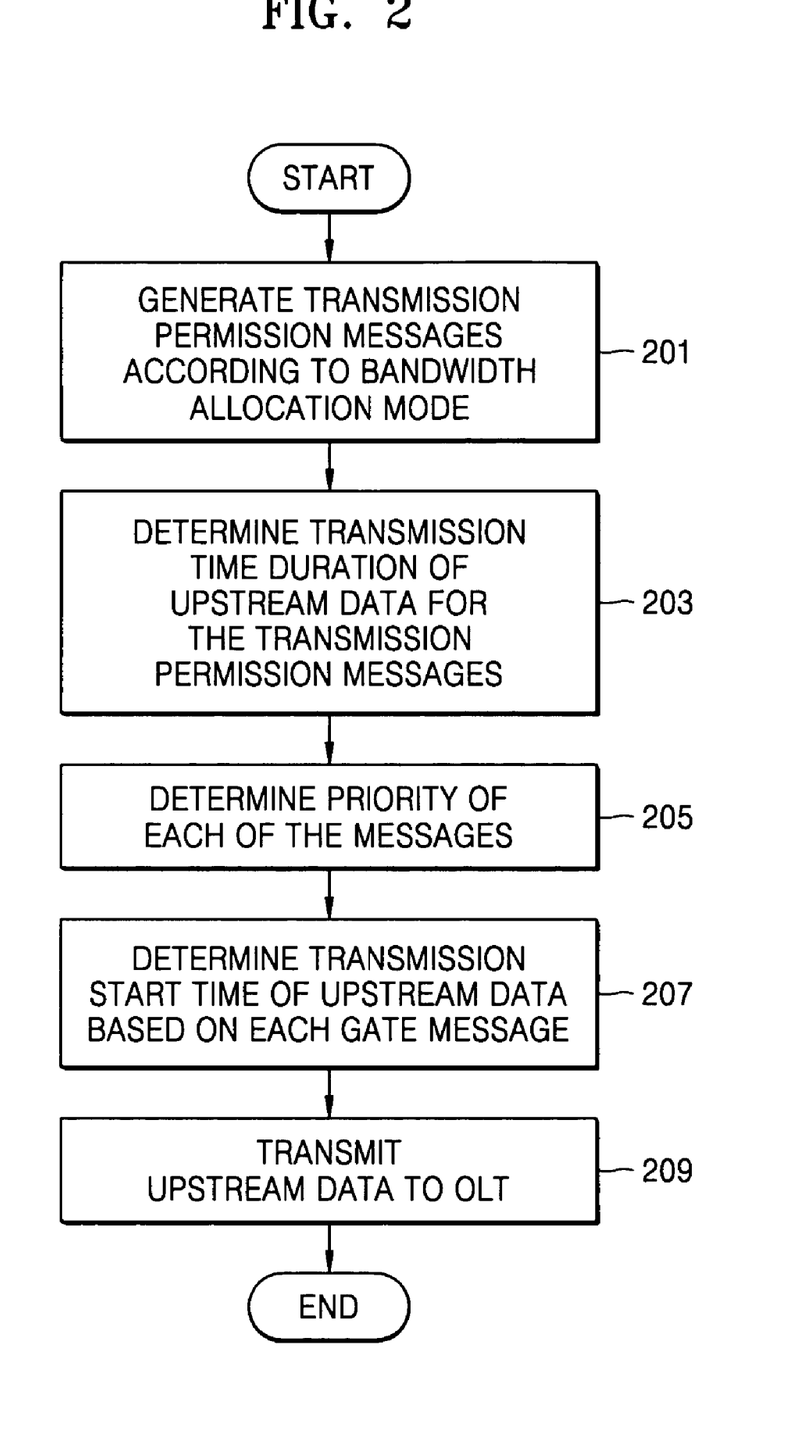
FIG. 2 is a flowchart illustrating a method for controlling upstream data transmission according to the present invention.

A method for controlling upstream data transmission of an EPON according to the present invention will be described with reference to FIG. 2.

Transmission control in the OLT is performed using GATE messages and REPORT messages. The GATE messages are used to grant transmission permissions to the ONU. ONUs activates the MAC layer during the permitted time and starts transmission of the upstream data at the transmission start time in GATE messages.

The REPORT messages are used by the ONUs to request bandwidth. The REPORT messages transmitted from the ONUs to the OLT contain the state of transmission waiting queues. The OLT allocates the bandwidth requested by the ONU using an appropriate transmission scheduling algorithm and transmits GATE messages to the ONU. The OLT should mediate the transmission order of ONUs so that collision does not occur at an optical branch point due to simultaneous transmissions attempts by several ONUs.

On the premise, the OLT determines which bandwidth allocation function is applied to the ONU, and should generate and transmit the appropriate GATE messages. A static bandwidth allocation mode is a mode in which the allocated bandwidth is fixed without requesting the bandwidth of an ONU and GATE messages are generated in cyclic way. On the other hand, a dynamic bandwidth allocation mode is a mode in which a GATE generation interval and a transmission time duration are determined according to the REPORT messages requested from an ONU. For this purpose, when a static bandwidth is allocated to an ONU, the OLT generates GATE messages with a provisioned period and transmission duration according to the characteristics of upstream data. When a dynamic bandwidth is allocated to an ONU, the OLT generates GATE messages, which include the allocated bandwidth.

In addition, the OLT generates GATE messages to allocate bandwidth for MPCP control messages, and to allocate a minimum bandwidth so that an ONU can request bandwidth after the silent state. Since the distance between the OLT and an ONU is different for each ONU, fragmentation may occur during upstream channel transmission. In order to prevent fragmentation, the GATE transmission order is aligned by the round trip time (RTT) in descending order when the static bandwidth or a minimum bandwidth allocation is applied. Then, the OLT generates GATE messages corresponding to the bandwidth allocated to each ONU. A static bandwidth allocation mode is used for delay sensitive services such as real-time voice or video services, and a dynamic bandwidth allocation mode is used for efficient use of bandwidth such as best-effort services. Thus, the two allocation modes are used together, according to the demands of an operator (the above is an explanation of step 201).

Next, the OLT determines a transmission time duration of upstream data for the above-mentioned GATE messages (step 203). As such, the ONU can transmit data to the OLT for the transmission time duration specified in the GATE messages. Meanwhile, the priority of the GATE messages can be arbitrarily determined or based on an operator's need (step 205). After determining the priority of the GATE messages, a transmission start time of the upstream data is determined based on each GATE message (step 207). The upstream data is transmitted to the OLT (step 209). In conclusion, the ONU transmits the data to the OLT according to the contents of the received GATE messages.

Figure 3A:
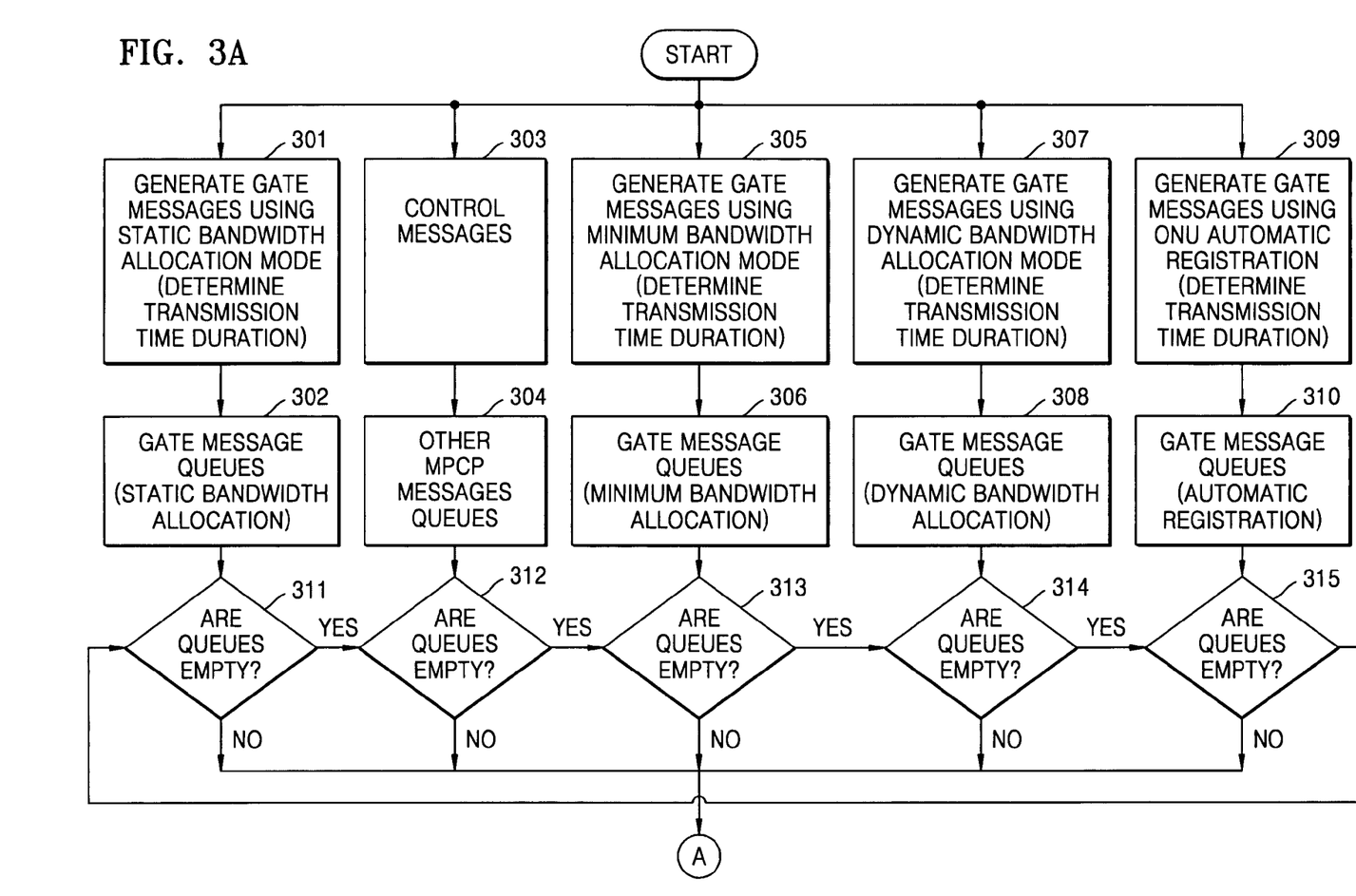
FIGS. 3A and 3B are flowcharts illustrating transmission of multi-point control protocol (MPCP) control messages according to the present invention.
Figure 3B:
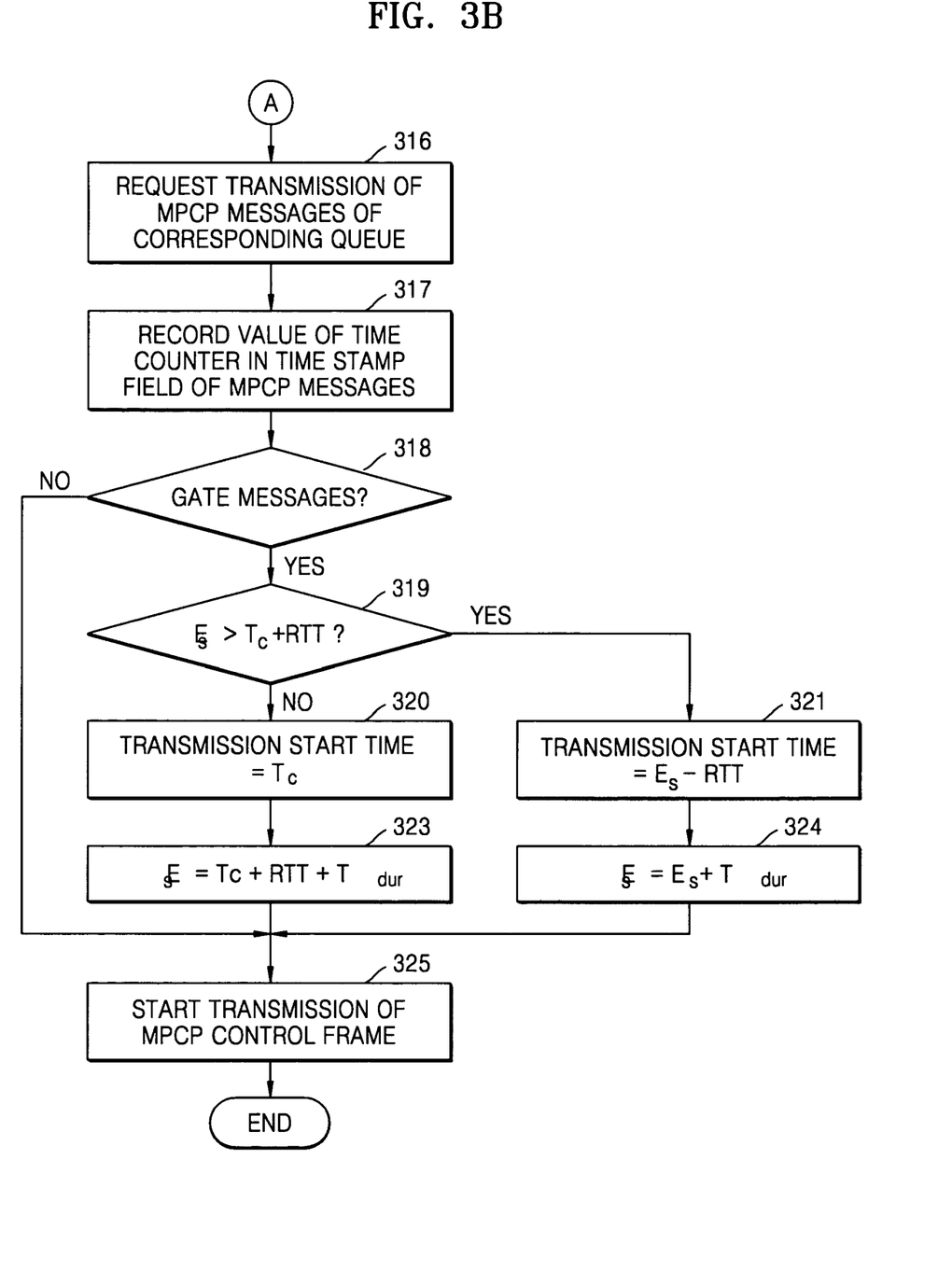

Until now, the method for controlling upstream data transmission according to the present invention has been schematically described. Now, preferred embodiments of the present invention will be described with reference to FIGS. 3A, 3B, and 4. FIGS. 3A and 3B are flowcharts illustrating transmission of multi-point control protocol (MPCP) control messages according to the present invention, and FIG. 4 is a functional block diagram illustrating an apparatus for controlling upstream data transmission according to the present invention.

Figure 4:
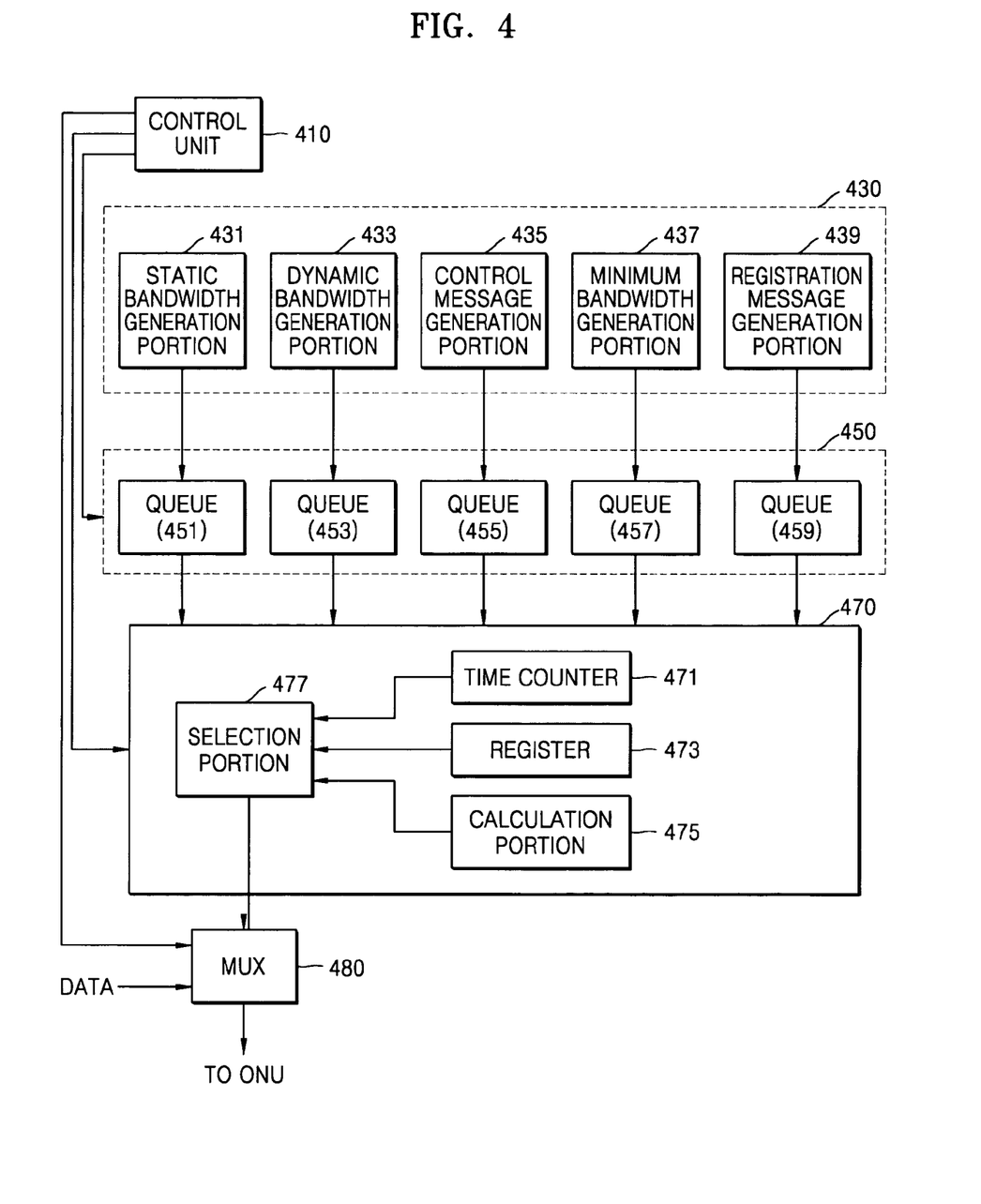
FIG. 4 is a functional block diagram illustrating an apparatus for controlling upstream data transmission according to the present invention.

Referring to FIG. 4, a bandwidth allocation unit 430, which generates GATE messages in an OLT, includes a static bandwidth generation portion 431, a dynamic bandwidth generation portion 433, a control message generation portion 435, a minimum bandwidth generation portion 437, and a registration message generation portion 439.

The registration message generation portion 439 generates auto-discovery GATE message for plug-in registration of a newly entered ONU in system. The minimum bandwidth generation portion 437 generates a GATE message to allocate a minimum bandwidth for a bandwidth request. The control message generation portion 435 generates other MPCP control messages.

A queuing unit 450 queues and outputs the independent GATE messages generated in each of the generation portions 431 through 439. The queuing unit 450 may include a plurality of queues 451 through 459.

A detailed block of the bandwidth allocation unit 430 will be described below. The static bandwidth generation portion 431 generates GATE messages to allocate a static bandwidth to the ONU. A static bandwidth allocation mode guarantees constant transmission delay and bandwidth. The static bandwidth allocation mode is applied to provide bandwidth guaranteed and delay sensitive services, such as E1, T1, and POTS. In the static bandwidth allocation mode, the bandwidth is shared using a time-division method.

When large variance of RTT exists, due to a different transmission distances between the ONUs and the OLT, unexpected fragmentation may occur in a transmission permission section of an upstream channel. This occurs because the transmission response time becomes long, due to the differences in RTT when transmission permission for an ONU having a short RTT and transmission permission for an ONU having a long RTT are consecutively performed. In order to prevent fragmentation when the static bandwidth allocation is applied, the OLT generates GATE messages in descending order of the RTT between an ONU and an OLT, so that data transmitted upstream by each ONU has a constant transmission time duration. The order of RTTs is maintained even when bandwidth allocation information regarding a new ONU is added to the transmission order map (step 301). The GATE messages generated in this way are transmitted to MPCP message transmission queues (step 302).

Meanwhile, queuing delay caused by a variable length Ethernet packet of may occur when MPCP messages are combined with a downstream data frame. As such, a small width variation may occur in a time slot start time. Thus, a static bandwidth allocation function according to the present invention does not provide strict time synchronization, like in static TDMA, but the effect of statistical static bandwidth allocation. The static bandwidth generation portion 431, which has a timer and a time slot map, periodically generates GATE information for a predetermined amount of time based on information on the time slot map.

In the case of using a dynamic bandwidth allocation function, the minimum bandwidth generation unit 437 is activated only when the dynamic bandwidth allocation function is activated and allocates a minimum bandwidth so that ONUs in a silent state can transmit REPORT messages for requesting bandwidth. When the minimum bandwidth allocation function is activated, GATE messages having a small length and indicating GATE type are cyclically generated and sent to all ONUs. In the minimum bandwidth allocation function, the generation period of GATE messages for each ONU is determined by considering a mean transmission request bandwidth of an ONU and the size of ONU transmission queues. Even in this procedure, in order to prevent fragmentation due to the variations in the above-described RTT, the generation order of GATE messages for minimum bandwidth allocation is determined using a descending order of RTT between an ONU and an OLT (step 305). The GATE messages for minimum bandwidth allocation are stored in a queue 457 (step 306).

The dynamic bandwidth generation portion 433 generates GATE messages for dynamic allocation of the bandwidth requested by the ONU. The OLT monitors the state of queues for each ONU based on REPORT messages, which are bandwidth request messages sent by the ONU, and records the state of queues for each ONU in a data region of an OLT scheduler 470. The OLT allocates bandwidth by determining a transmission time duration using an algorithm set according to the bandwidth request of the recorded ONU (step 301), stores the GATE messages in a queue 451 (step 302), and transmits the stored GATE messages to each ONU.

The dynamic bandwidth allocation function is used for services that are not sensitive to transmission delay. The dynamic bandwidth allocation function does not guarantee uniform transmission quality for each service but can efficiently use the entire bandwidth.

Hereinafter, a process of plug-in registration for a newly entered ONU will be described.

The registration message generation portion 439 has no direct relation to the bandwidth allocation function of an upstream channel, but generates auto-discovery GATE messages to register a newly added ONU during operation of a PON system (step 309). The GATE messages are stored in a queue 459 (step 310). During a transmission permission time, the OLT allows a new ONU to request registration by broadcasting auto-discovery GATE messages periodically. The transmission permission time of an auto discovery GATE is set at a sufficient duration by considering the round trip time (RTT) of a subscriber placed at a maximum distance in the network.

The control message generation portion 435 generates control MPCP messages (step 303) and stores the generated messages in a queue 455 (step 304).

The OLT according to the present invention generally uses a static bandwidth allocation mode. However, when a dynamic bandwidth allocation function is activated, the OLT priorly performs a minimum bandwidth allocation function, and then, starts the bandwidth allocation process. When the dynamic bandwidth allocation function is deactivated, the minimum bandwidth allocation function is simultaneously deactivated. A control unit 410 selectively designates static bandwidth allocation or dynamic bandwidth allocation according to the demand of an operator or the requirements of a system, or designates two bandwidth allocation modes together. Functional blocks for bandwidth allocation, except for the registration message generation portion 439, can be activated or deactivated by the operator, and registration information and parameters required for bandwidth allocation can be changed by the operator during a system operation.

After registration process and bandwidth allocation process are performed by the registration message generation portion 439 and the bandwidth generation portions 431 through 437 respectively, GATE messages generated in queues for each functional module are scheduled again by the scheduler 470 before being finally transmitted to the ONU via a MAC layer. Thus, GATE messages are scheduled twice by determining the transmission time duration using the bandwidth generation portion 430 and reserving a transmission start time for each ONU using the scheduler 470. The dual scheduling technique makes bandwidth allocation function of an MPCP master in the OLT simple and makes transmission control efficient by assigning a transmission priority according to the GATE message type.

The scheduler 470 includes a time counter 471, a register 473, a calculation portion 475, and a selection portion 477. The time counter 471 registers the operating time of the OLT. The transmission end time of upstream data transmitted by the ONU is recorded in the register 473. The calculation portion 475 determines the transmission start time based on the value of the time counter 471 and the register 473. The selection portion 477 selects a GATE message based on priority and then outputs the GATE message.

The scheduler 470 selects a message for transmission by assigning the transmission priority according to the GATE message type, in which the GATE message is in a standby state in a corresponding queue of the queues 451 through 459 for each functional module and transmission delay request of other MPCP messages related to ONU registration (step 316). Thereafter, when the selected message for transmission is a GATE message, the scheduler 470 reserves the transmission start time of the ONU by referring to the current time and the transmission time duration, and records the transmission start time in a transmission time field of the GATE message (step 317). In the MAC layer of the OLT, GATE messages for static bandwidth allocation are transmitted with the highest priority, according to the priority assigned by the scheduler 470, and transmission of other control messages is performed only when the message queues for static bandwidth allocation are empty (steps 311 through 315). Transmission of Ethernet frames in the MAC layer is arranged in order of priority as follows.

A. Static bandwidth allocation GATE messages
    B. REGISTER messages to inform registration of an ONU
    C. Minimum bandwidth allocation GATE messages
    D. Dynamic bandwidth allocation GATE messages
    E. Auto-discovery GATE messages to automatically register an ONU
    F. Downstream data frame The OLT synchronizes transmission between an ONU and an OLT by operating a 2-bytes time counter of current time. A transmission time duration and a transmission start time are stored in the time counter 471 as values of the time counter operated by the OLT. The transmission start time is determined according to the time required in the MAC control layer for operating the time counter 471 before the GATE messages are transmitted. Thus, the MPCP bandwidth allocation unit 430 can schedule transmission of an upstream channel without considering the queuing delay time for each GATE message, due to multiple bandwidth allocation queues and the transmission delay time, due to multiplexing between an MPCP control frame and a variable length data frame. Thus, the present invention can simplify the bandwidth allocation algorithm for each function of the MPCP master and improve the accuracy of the measurement of RTT between an ONU and an OLT.

The transmission start time for GATE messages in the MAC control layer is determined by an RTT of the ONU and permits transmission according to the current time counter of the OLT and the estimated end time of upstream frame transmission, which uses the final GATE messages transmitted from the OLT. The scheduler 470 of the OLT calculates the transmission start time by subtracting the RTT of the ONU from the point of the nearest expected time to start transmission on the OLT side, using the above-described parameters at right before the GATE messages are transmitted. Then, the scheduler 470 transmits the GATE messages to the ONU.

To this end, the OLT records in the register 473 at the point in time when upstream data transmission is completed using a corresponding GATE message. Meanwhile, a multiplexing unit 480 receives the data actually transmitted with the GATE messages and selectively outputs the data. In this case, when data is input to the multiplexing unit 480, the multiplexing unit 480 outputs data in response to a selection signal of the control unit 410, and when GATE messages are input to the multiplexing unit 480, the multiplexing unit 480 outputs the GATE messages through the following steps.

Basically, the MAC control layer determines the transmission start time of GATE messages, which are transmitted based on contents of the register 473 and the value of the current time counter when the GATE messages are transmitted. At this time, the determination is made on whether the message to be transmitted is a GATE message (step 318), assuming that the upstream frame transmission end time (contents of the OLT register 473) using the last scheduled and transmitted GATE message is $E_s$, a current time counter is $T_c$, and a transmission time duration of the GATE message to be transmitted is $T_{dur}$. If the message to be transmitted is a GATE message, the value obtained by adding the current time counter to an RTT is compared with $E_s$ (step 319). If the value obtained by adding $T_c$ to the RTT is greater than Es, the value obtained by subtracting the RTT from $E_s$ is determined as a transmission start time (step 321), and the value obtained by adding $T_{dur}$ to $E_s$ is updated as the new $E_s$ (step 324). In this case, upstream channel is reserved by other ONUs until the further than current time. Thus, the transmission start time of the ONU should be determined as the value obtained by subtracting the RTT from $E_s$ ($E_s$–RTT), which is the upstream frame transmission end time. On the other hand, if the value obtained by adding $T_c$ to the RTT is less than or equal to $E_s$, $T_c$ is determined as the transmission start time (step 320), and the value obtained by adding the RTT and $T_{dur}$ to $T_c$ is updated as new $E_s$ (step 323). Next, each MPCP control frame is transmitted (step 325). This reflects the case in which the transmission schedule of the upstream channel for other ONUs ends prior to the point in time when the ONU starts transmission. This case may occur when many available regions of the upstream channel exist. If the transmission start time is reserved in this state and the ONU starts transmission at $T_c$, which is the current OLT time, the ONU transmits upstream data immediately after receiving GATE messages, and the OLT is able to receive the data after the RTT. As a result, the above contents are recorded in the GATE messages and transmitted to the ONU, thereby efficiently performing control of upstream data transmission.

Meanwhile, the method for controlling upstream data transmission in an Ethernet passive optical network (EPON) according to the present invention can be implemented through computer hardware, such as an internal chip in an FPGA or ASIC format. In addition, the method for controlling upstream data transmission of an EPON according to the present invention can be implemented with computer readable code on computer readable recording media. The computer readable recording media includes all kinds of recording apparatuses in which computer readable data is stored. The computer readable recording media includes ROMs, RAMs, CD-ROMs, magnetic tapes, floppy discs, and optical data storage apparatuses, and further include carrier waves (i.e., transmission via Internet). The computer readable recording media is dispersed throughout a computer system that is connected to a network, and thus computer readable code can be stored and executed by a dispersion method. In addition, the ROM data structure according to the present invention can be implemented with computer readable codes on computer readable recording media such as ROMs, RAMs, CD-ROMs, magnetic tapes, floppy discs, and optical data storage apparatuses.

As described above, in the method for controlling upstream data transmission of an EPON according to the present invention, an apparatus and method, which can simultaneously or selectively accommodate a static bandwidth allocation function and a dynamic bandwidth allocation function, have been presented. According to the present invention, an optical network unit (ONU) can apply a differentiated bandwidth allocation function, depending on various subscriber services, thus implementation of an MPCP control function of an optical line termination (OLT) becomes simplified. In addition, through the concept of dual scheduling technique for constructing GATE message, which separates the process of transmission start time decision from GATE generation, transmission scheduling of an upstream channel is possible without considering the queuing delay time, due to multiplexing between an MPCP control frame and a variable length data frame, and a more accurate measurement of a round trip time (RTT) between the ONU and the OLT can be made.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of controlling data transmission in an Ethernet passive optical network (EPON) using a multi-point control protocol (MPCP), the method comprising:
    (a) generating transmission permission messages using a bandwidth allocation mode and determining a transmission time duration of upstream data corresponding to the transmission permission messages;
    (b) queuing the transmission permission messages according to types of the transmission permission messages;
    (c) determining priorities of the transmission permission messages based on the types of the transmission permission messages and registration information of an optical network unit (ONU) that receives the transmission permission messages; and
    (d) determining a transmission start time of upstream data based on a priority and outputting the transmission permission messages.

2. The method of claim 1, wherein the step (a) comprises:
    (a1) when allocating a static bandwidth, generating first transmission permission messages, which contain a period and a transmission time duration according to a characteristic of the upstream data;
    (a2) when allocating a dynamic bandwidth, generating second transmission permission messages, which include the allocated bandwidth information; and
    (a3) generating third transmission permission messages to allocate bandwidth for MPCP control messages.

3. The method of claim 2, wherein in the step (a1), the first transmission permission messages are generated in descending order of a round trip time (RTT) of the ONU.

4. The method of claim 2, wherein the step (a) further comprises (a4) selecting one of static bandwidth allocation and dynamic bandwidth allocation and both static bandwidth allocation and dynamic bandwidth allocation.

5. The method of claim 4, wherein the step (a) further comprises (a5) generating fourth transmission permission messages, which are activated when allocating the dynamic bandwidth, to allocate bandwidth for transmitting a bandwidth request of the ONU while in a transmission silent state.

6. The method of claim 5, wherein the fourth transmission permission messages are generated in descending order of an RTT of the ONU which receives the fourth transmission permission messages.

7. The method of claim 5, further comprising (e) generating fifth transmission permission messages to automatically register a newly entered ONU in a network.

8. The method of claim 7, wherein the step (c) comprises (c1) designating a priority between the first through fifth transmission permission messages and outputting a message of a queue having a next priority only when a queue having a current priority is empty.

9. The method of claim 2, wherein the step (d) comprises (d1) determining the transmission start time using a value obtained by subtracting an RTT of the ONU from an estimated time when the upstream data is to be received.

10. The method of claim 9, wherein the step (d1) comprises:
    (d11) recording a point in time corresponding to an end of upstream data transmission of the ONU using the first and second transmission permission messages; and
    (d12) determining the transmission start time based on an estimated end time and a time counter of an optical line termination (OLT).

11. The method of claim 10, wherein in the step (d12), it is assumed that a transmission end time of the upstream data, which uses the lastest permission, is E.sub.s, a current time counter is T.sub.c and a transmission time duration of the upstream data is T.sub.dur, if a value obtained by adding T.sub.c to the RTT is greater than E.sub.s, a value obtained by subtracting the RTT from E.sub.s is determined as a transmission start time, and a value obtained by adding T.sub.dur to E.sub.s is updated as new E.sub.s, if the value obtained by adding T.sub.c to the RTT is less than or equal to E.sub.s, T.sub.c is determined as the transmission start time, and a value obtained by adding the RTT and T.sub.dur to T.sub.c is updated as a new E.sub.s.

12. An apparatus which controls data transmission in an Ethernet passive optical network (EPON) using a multi-point control protocol (MPCP), the apparatus comprising:
    a bandwidth allocation unit, which generates transmission permission messages to allocate upstream data transmission bandwidth to each optical network unit (ONU);
    a queuing unit, which queues the transmission permission messages according to types of the transmission permission messages;
    a scheduler, which determines priorities of the transmission permission messages from queues based on registration information of each optical network unit (ONU) that receives the transmission permission messages, determines a transmission start time of upstream data based on a priority, and outputs the transmission permission messages; and
    a control unit, which selectively designates static bandwidth allocation and dynamic bandwidth allocation.

13. The apparatus of claim 12, wherein the bandwidth allocation unit comprises:
    a static bandwidth generation portion, which generates first transmission permission messages that are activated when allocating a static bandwidth, which contain a period and a transmission time duration according to a characteristic of the upstream data in descending order of a round trip time (RTT) of the ONU that receives the first transmission permission messages;
    a dynamic bandwidth generation portion, which generates second transmission permission messages that are activated when allocating dynamic bandwidth and include the allocated bandwidth information;
    a control message generation portion, which generates third transmission permission messages to allocate bandwidth for MPCP control messages;
    a minimum bandwidth generation portion, which generates fourth transmission permission messages that are activated when allocating the dynamic bandwidth and allocate bandwidth for transmitting a bandwidth request of the ONU, while in a transmission silent state, in descending order of the RTT of the ONU that receives the fourth transmission permission messages; and
    a registration message generation portion, which generates fifth transmission permission messages to assign a transmission permission time for registration of a newly entered ONU in the EPON.

14. The apparatus of claim 12, wherein the scheduler comprises:
    a time counter, which records an operating time of an optical line termination (OLT);
    a register, which records a transmission scheduling end time of the upstream data; and
    a calculation portion, which determines a transmission start time based on outputs of the time counter and the register.

15. The apparatus of claim 13, wherein the control unit determines activation of operations in the static bandwidth generation portion, the dynamic bandwidth generation portion, and the minimum bandwidth generation portion according to a property of the upstream data.

16. A computer readable recording medium on which a program is recorded, the program used for executing the method of controlling data transmission in an Ethernet passive optical network (EPON) using a multi-point control protocol (MPCP), wherein the method comprises:
(a) generating transmission permission messages using a bandwidth allocation mode and determining a transmission time duration of upstream data corresponding to the transmission permission messages;
(b) queuing the transmission permission messages according to types of the transmission permission messages;
(c) determining priorities of the transmission permission messages based on the types of the transmission permission messages and registration information of an optical network unit (ONU) that receives the transmission permission messages; and
(d) determining a transmission start time of upstream data based on a priority and outputting the transmission permission messages.

* * * * *